United States Patent
Vieregge

(10) Patent No.: US 6,305,722 B1
(45) Date of Patent: Oct. 23, 2001

(54) TELESCOPIC TUBE, IN PARTICULAR FOR SPRINKLER SYSTEMS

(76) Inventor: Uwe Vieregge, Kantstrasse 10, Grundau (DE), 63584

( * ) Notice: Subject to any disclaimer, the term of this patent is extended or adjusted under 35 U.S.C. 154(b) by 0 days.

(21) Appl. No.: 09/230,729
(22) PCT Filed: Aug. 6, 1997
(86) PCT No.: PCT/EP97/04295
§ 371 Date: Feb. 2, 1999
§ 102(e) Date: Feb. 2, 1999
(87) PCT Pub. No.: WO98/06967
PCT Pub. Date: Feb. 19, 1998

(30) Foreign Application Priority Data

Aug. 9, 1996 (DE) .............................. 196 32 133

(51) Int. Cl.$^7$ .................................................. F16L 27/12
(52) U.S. Cl. .................... 285/298; 285/382; 285/404; 285/906; 285/915
(58) Field of Search .................. 285/382, 404, 285/906, 915, 298, 302, 331

(56) References Cited

U.S. PATENT DOCUMENTS

| | | | |
|---|---|---|---|
| 982,836 | * | 1/1911 | Ley et al. .............................. 285/302 |
| 3,458,920 | * | 8/1969 | Crump .................................. 285/331 |
| 3,508,428 | | 4/1970 | Matson . |
| 4,103,937 | | 8/1978 | Wakefield . |
| 5,277,457 | * | 1/1994 | Hayashi ............................... 285/331 |

FOREIGN PATENT DOCUMENTS

| | | |
|---|---|---|
| 295 14 818 U | 12/1995 | (DE) . |
| 0428120 | 5/1991 | (EP) . |
| 0536740 | 4/1993 | (EP) . |
| 1303043 | 1/1973 | (GB) . |

* cited by examiner

Primary Examiner—Dave W. Arola
(74) Attorney, Agent, or Firm—Bierman, Muserlian and Lucas

(57) ABSTRACT

The invention concerns a telescopic tube (10), in particular for sprinkler systems, comprising an outer tube (12) and an inner tube (14) which is movable relative to the latter and has an inner end piece (36) which extends inside the outer tube and has an outer diameter which is larger than the inner tube in their adjoining regions. The telescopic tube (10) further comprises a securing element (26) which surrounds the inner tube and is provided for the outer tube, the outer end (22) of the latter extending in said securing element (26). According to the invention, in order to provide a precise connection between the inner and outer tubes using precision screw machine parts in particular, the outer end (22) of the outer tube is widened and extends inside an annular mounting (24) of the securing element which in turn comprises an outer edge (34) which extends externally along the outer tube and is deformed in the direction of the outer end of the outer tube when the latter has been fitted in the mounting.

11 Claims, 1 Drawing Sheet

TELESCOPIC TUBE, IN PARTICULAR FOR SPRINKLER SYSTEMS

A corresponding telescopic tube is shown in FIG. 1 of EP 0 536 740 A1. The element securing the outer tube to the inner tube is designed as a cap nut using which the outer tube can be screwed on. The cap nut itself can be secured relative to the inner tube by means of a grub screw. The drawback of a fastening means in the form of a cap nut is that the latter can be tightened excessively or insufficiently. Insufficient tightening results in the inner tube remaining movable relative to the outer tube, thereby rendering it impossible to use a corresponding telescopic tube for the intended purpose. Excessive tightening of the cap nut, while preventing any relative movement, involves the risk of permanent damage to the cap nut or to its thread or to the thread of the outer tube, so that further loosening and tightening for further adjustment of the telescopic tube array is not possible. According to EP 0 428 120 A2 and U.S. Pat. No. 3,783,178 too, fixing between the outer tube and inner tube is achieved using a cap nut.

DESCRIPTION
Telescopic Tube in Particular for Sprinkler Systems

The invention relates to a telescopic tube in particular for sprinkler systems comprising an outer tube and an inner tube which is movable relative thereto and which has an end section extending inside the outer tube, said section having an outer diameter which is larger than the inner tube in their adjoining regions, and to a securing element which surrounds the inner tube for the outer tube, the outer end of which extends in said securing element.

According to the embodiments in FIGS. 3 and 4 of EP 0 536 740 1, the connection between the outer tube and inner tube is achieved using a captively arranged setting ring disposed in a flared portion at the end of the outer tube. The setting ring is secured inside the outer tube by crimping or pressing in of the edge of the outer tube. The inner diameter of the setting ring must here be less than the outer diameter of the outer tube at its inner end piece, which is designed with a bulge.

DE 295 14 818 U1 shows a telescopic tube array in which an outer tube is fixed relative to a middle tube by a setting ring, as shown for example in EP 0 536 740 B1.

EP 0 472 379 A1 describes a connection between tubes using a coupling piece, inside which is a sleeve that rests on seals. According to U.S. Pat. No. 3,878,3178, tubes axially movable relative to one another are secured using screw connections.

DE-GM 1 814 264 relates to antenna mast tubes movable inside one another and under compressive pressure against each other.

From U.S. Pat. No. 3,508,428 a non-generic connection between rigid electrical conductors is known where a screw element having a male thread with flared edge on the end side is introduced into an insert of a connecting element. For fixing the screw element inside the connecting element, edge sections are bent over in the direction of the screw element in order to enclose the flared portion.

The problem underlying the present invention is to improve a telescopic tube of the type mentioned at the outset such that the elements used can be manufactured inexpensively and precisely. It should also be possible to achieve unproblematic yet precise movement between the inner tube and outer tube. Furthermore, the it should be possible to cut the telescopic tube to the required length without problem. Finally, operation should also be assured in the case of high pressure surges and temperature fluctuations.

The problem is substantially solved in accordance with the invention in that the outer end of the outer tube is flared and extends inside an annular mounting of the securing element which in its turn has an outer edge that the annular mounting for the flared edge of the outer tube has an inward limiting surface at an angle to the longitudinal axis of the tube and on which the flared edge rests on the inside, and that the securing element has an outer edge extending along the outside of the outer tube and is shaped in the direction of the edge of the outer tube when the outer end of the outer tube has been inserted into the mounting in order to secure it.

The outer edge of the securing element, also designated as the mounting ring, can be bent, crimped or pressed over in the direction of the preferably flared outer end of the outer tube.

To adequately secure the outer tube inside the securing element, the outer edge of the securing element should extend up to or almost up to the transition between the axially straight outer surface of the outer tube and its flared outer end.

The securing element itself is an annular element that can be secured on the outer surface of the inner tube, using for example a screw element such as a grub screw. It is of course also possible to screw the ring element to the inner tube.

The annular mounting itself can be a groove with V-shaped or U-shaped section whose inner surface slopes towards the inner tube on the tube side. In other words, the inner limiting surface runs at an inclination angle in the direction of the longitudinal axis of the outer tube that corresponds to the shape of the flared outer end of the outer tube.

It is furthermore provided in accordance with the invention that the inner tube is having an inner end section in the form of an insert sealed off from the latter and whose outer diameter projects beyond that of the inner tube and has an all-round sealing element such as an O-ring sealing it from the outer tube. Since the insert or end piece forming the inner end of the inner tube is sealed off from the latter, the inner tube is accordingly sealed off to the required extent from the outer tube by the end piece.

The end piece can—like all the other parts of the telescopic tube in accordance with the invention too—be manufactured as a machine part, so that an inexpensive yet very precise manufacture is assured. The end piece is screwed to the inner tube and sealed to the required extent using adhesive or similar.

The outer tube itself should be a threaded tube that can be cut to length and whose inner and outer diameters are widened, i.e. calibrated, in the overlap area with the inner tube.

Unlike in the prior art, it is now no longer necessary for the inner tube to bulge out for a captive arrangement inside the outer tube. Instead, it is only necessary for the end piece to be connected to the inner tube, for example by screw connection, glueing or compressing. The captive characteristic is achieved by the securing element—designated as the mounting ring—having an inner diameter that is less than the outer diameter of the end piece, with the mounting ring itself being securable to the inner tube using a screw element or by screw connection, as already mentioned.

The outer tube designed as a threaded tube only needs a flared portion at its end, and this can also be provided by automatic machinery.

For practical operation, it is only necessary to cut off the outer tube to the required length, with a visual marking as indication of where the calibrated area runs inside which the inner tube extends.

The invention is described in the following on the basis of preferred design examples, showing further details, advantages and features of the invention.

Figures 1, 2, 3, 4:
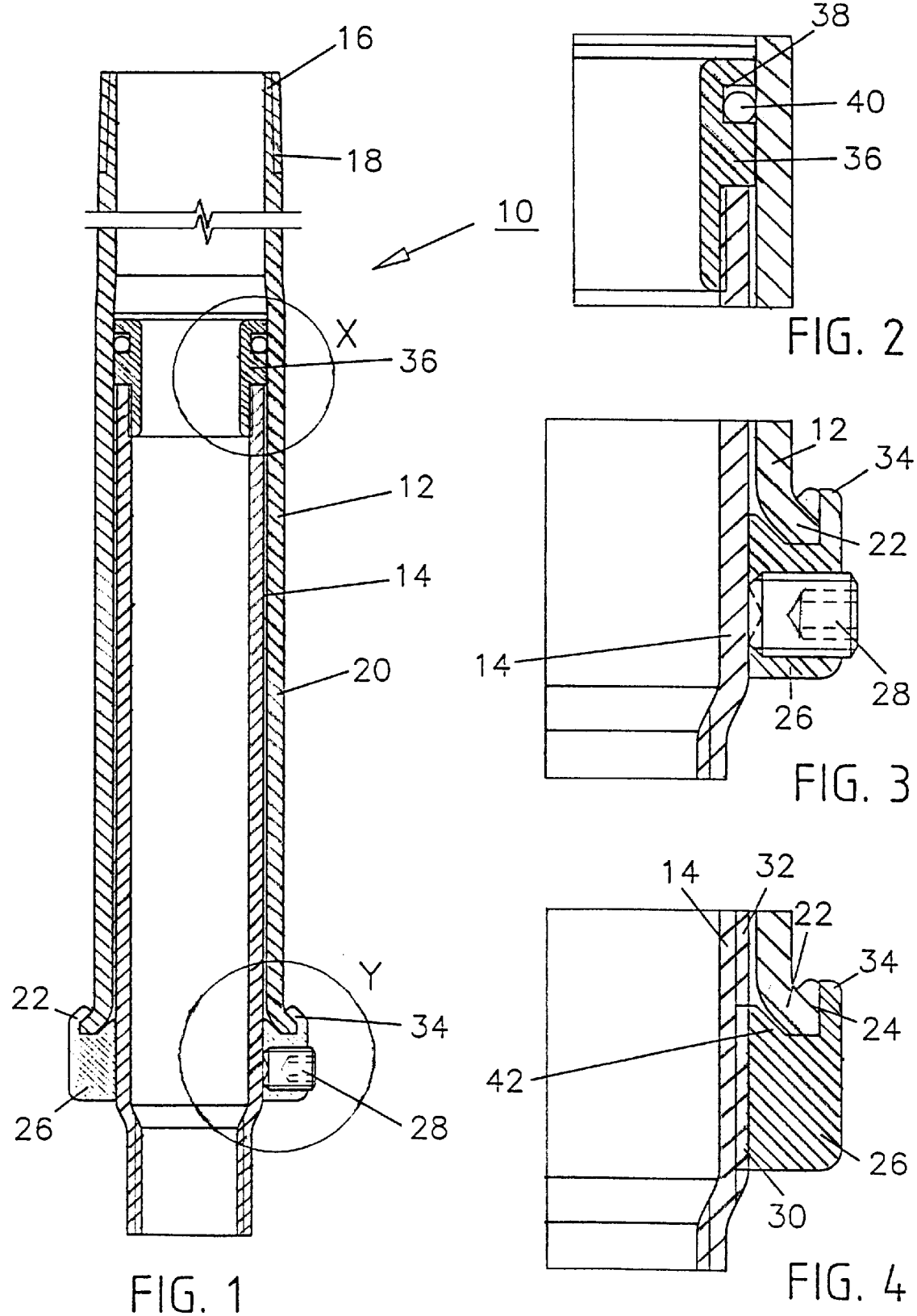
FIG. 1 shows a section through a first embodiment of a telescopic tube.
FIG. 2 shows a detailed view of the area X in Fig. 1.
FIG. 3 shows a detailed view of the area Y in FIG. 1.
FIG. 4 shows an alternative embodiment of a telescopic tube in the area Y of FIG. 1.

FIG. 1 shows a longitudinal section of an illustration showing the principle of a telescopic tube 10 in accordance with the invention and comprising an outer tube 12 and an inner tube 14. The outer tube 12 has a thread 18 at its end 16 on the connection side. In the area of the end 16 on the connection side, the inner and outer diameters of the outer tube 12 are smaller than in the adjacent area 20 inside which the inner tube can be moved. At its outer end 22 opposite the constriction 16, the outer tube 12 flares out, i.e. has a flared portion that extends inside an annular mounting 24 of a mounting ring 26 when the outer tube 12 is to be secured relative to the inner tube. The mounting ring 26 and the inner tube 14 are fixed relative to one another using a grub screw 28 in the embodiments of FIGS. 1 and 3. In accordance with the embodiment in FIG. 4, the mounting ring 26 has a female thread 30 which can be screwed onto the inner tube 14 having a male thread 32.

As shown in particular in the detailed views in FIGS. 3 and 4, the annular mounting 24 receives its final geometry when the outer tube 12 is inserted with its flared edge 22 into the mounting 24 and the mounting ring 26 is then bent, for example crimped, with its free wall section 34 passing on the outside along the edge 22 of the outer tube 12 in the direction of the edge 22, and is in contact with the outside thereof, as shown in the view in FIGS. 1, 3 and 4. This ensures dependable securing of the outer tube in the mounting ring 26 and hence relative to the inner tube 14. Furthermore, the figures show that the bent-over section 34 extends as far as the transition area between the flared edge 22 and the axially straight outer surface of the outer tube 12.

The outer tube 12 itself is preferably a threaded tube whose area 20 is calibrated to permit adjustment of the inner tube 14 within this area. The mounting ring 26 is preferably an automatically manufactured part which can be made inexpensively and very precisely.

The inner tube 14 too can be a standard tube, the outer diameter being adapted to the inner diameter of the mounting ring 26. To rule out the inner tube 14 being pulled out of the mounting ring 26 and hence out of the outer tube 12, the inner tube 14 has on its inner end side an inner end section in the form of an end piece 36 that is connected to the inner tube 14 for example by glueing, screw-connection or compressing and is sealed from the inner tube 14 in the usual way. The outer diameter of the end piece 36 is here greater than that of the inner tube 14 and hence also larger than the inner diameter of the mounting ring 26, such that the latter can serve as a stop against the inner tube 14 being pulled out.

On the circumference side, the end piece 36 has a seal in the form of an O-ring 40 inserted into a groove 38, for sealing the end piece 36 and hence also the inner tube 14 from the outer tube 12.

The elements forming the telescopic tube in accordance with the invention are substantially parts made by automatic machinery or standard products such as threaded tubes that must be calibrated or widened for further development in accordance with the invention.

Proper securing is assured by the insertion of the flared end 22 of the outer tube 12 into the corresponding mounting 24 of the mounting ring 26. The flared edge 22 is here supported on an inner surface 42 of the mounting 24 running obliquely to the longitudinal axis of the telescopic tube array, i.e. with an inclination, in order to rule out any deformation when bending or crimping over the outer wall section 34 of the mounting ring 26.

What is claimed is:

1. A telescopic tube (10) for sprinkler systems comprising an outer tube (12) and an inner tube (14) which is movable relative thereto and which has an end section (36) extending inside the outer tube, said end section having an outer diameter which is larger than the inner tube in their adjoining regions, and a securing element (26) which surrounds the inner tube and the outer tube, the outer end (22) of the outer tube extends into said securing element, wherein the outer end (22) of the outer tube (12) is flared and extends inside an annular mounting (24) of the securing element (26), wherein the annular mounting for the flared edge of the outer tube has an inward limiting surface (42) at an angle to the longitudinal axis of the tube and on which the flared edge rests on the inside, and wherein the securing element has an outer edge (34) extending along the outside of the outer tube and is deformed in the direction of the flared edge of the outer tube when the outer end of the outer tube has been inserted into the mounting to secure said securing element to said flared end.

2. Telescopic tube according to claim 1, wherein the outer edge (34) of the securing element (26) extends up to or almost up to the transition between the axially straight outer surface of the outer tube (12) and its flared outer end (22).

3. Telescopic tube according to claim 1 wherein the securing element (26) is an annular element that is securable relative to the inner tube (14) by a screw element.

4. A telescopic tube of claim 3 wherein the screw element is a grub screw (28).

5. Telescopic tube according to claim 1, wherein the securing element (26) is screwed onto the inner tube (14).

6. Telescopic tube according to claim 1, wherein the end section is in the form of an end piece (36) connectable to the inner tube and whose outer diameter is greater than the inner diameter of the securing element (26).

7. Telescopic tube according to claim 1, wherein the end section (36) is connected to the inner tube (14) by screw connection, glueing or compressing.

8. Telescopic tube according to claim 1, wherein the end section (36) is threaded to said inner tube.

9. Telescopic tube according to claim 1 wherein a sealing element sealing the inner tube (14) from the outer tube (12) is inserted into the end piece (36).

10. A telescopic tube of claim 8 wherein the sealing element is an O-ring (40).

11. Telescopic tube according to claim 1, wherein the outer tube (12) is a threaded tube that can be cut to length and whose inner and outer diameters are widened in the overlap area with the inner tube (14).

* * * * *